US012706758B2

(12) United States Patent
Park et al.

(10) Patent No.: US 12,706,758 B2
(45) Date of Patent: Aug. 11, 2026

(54) SYSTEM FOR BLOCKCHAIN-BASED CERTIFICATE

(71) Applicants: SEOUL UNIVERSITY OF FOREIGN STUDIES INDUSTRY ACADEMY COOPERATION FOUNDATION, Seoul (KR); SOONCHUNHYANG UNIVERSITY INDUSTRY ACADEMY COOPERATION FOUNDATION, Asan-si (KR)

(72) Inventors: Keundug Park, Seoul (KR); Heungyoul Youm, Seoul (KR)

(73) Assignees: SEOUL UNIVERSITY OF FOREIGN STUDIES INDUSTRY ACADEMY COOPERATION FOUNDATION, Seoul (KR); SOONCHUNHYANG UNIVERSITY INDUSTRY ACADEMY COOPERATION FOUNDATION, Asan-si (KR)

( * ) Notice: Subject to any disclaimer, the term of this patent is extended or adjusted under 35 U.S.C. 154(b) by 225 days.

(21) Appl. No.: 18/682,049

(22) PCT Filed: Aug. 18, 2021

(86) PCT No.: PCT/KR2021/010976
§ 371 (c)(1),
(2) Date: Feb. 7, 2024

(87) PCT Pub. No.: WO2023/022252
PCT Pub. Date: Feb. 23, 2023

(65) Prior Publication Data

US 2025/0062919 A1 Feb. 20, 2025

(30) Foreign Application Priority Data

Aug. 18, 2021 (KR) ........................ 10-2021-0108819

(51) Int. Cl.
*H04L 9/32* (2006.01)
*H04L 9/08* (2006.01)

(52) U.S. Cl.
CPC .......... *H04L 9/3268* (2013.01); *H04L 9/0825* (2013.01); *H04L 9/3247* (2013.01)

(58) Field of Classification Search
None
See application file for complete search history.

(56) References Cited

U.S. PATENT DOCUMENTS

2020/0366480 A1* 11/2020 Noonan ................ H04L 9/3263
2021/0044976 A1* 2/2021 Avetisov ............... H04W 12/08
2022/0005022 A1* 1/2022 Tu ...................... G06Q 20/3276

FOREIGN PATENT DOCUMENTS

KR 10-2189301 B1 12/2020
KR 10-2211937 B1 2/2021
(Continued)

OTHER PUBLICATIONS

Garba, A., Chen, Z., Guan, Z. and Srivastava, G., 2021. LightLedger: A novel blockchain-based domain certificate authentication and validation scheme. IEEE Transactions on Network Science and Engineering, 8(2), pp. 1698-1710. (Year: 2021).*
(Continued)

*Primary Examiner* — Luu T Pham
*Assistant Examiner* — Edward X Long

(57) ABSTRACT

Disclosed are a system for a blockchain-based certificate and software stored in a computer-readable storage medium for operation thereof. The system comprises: an issuer device that issues, to a user terminal, a certificate including a digital signature of an issuer in response to a certificate issuance request from user terminal, and stores, in off-chain, information associated with issuance of certificate, the certificate issuance request including first public key of user and personal information of user, and the information associated
(Continued)

with issuance of certificate including user's first public key, the user's personal information, and second public key of issuer; user terminal that provides service provider terminal with certificate including digital signature of user via wireless communication to receive verification of certificate; and service provider terminal that verifies certificate via on-chain, wherein at least some of information associated with issuance of certificate, stored in off-chain, is synchronized and stored in on-chain.

12 Claims, 9 Drawing Sheets

(56) References Cited

FOREIGN PATENT DOCUMENTS

| | | | |
|---|---|---|---|
| KR | 10-2021-0040569 | A | 4/2021 |
| KR | 10-2021-0066326 | A | 6/2021 |
| KR | 10-2280061 | B1 | 7/2021 |

OTHER PUBLICATIONS

Saleh, O.S., Ghazali, O. and Rana, M.E., 2020. Blockchain based framework for educational certificates verification. Journal of critical reviews. (Year: 2020).*

Park, Keundug, "Main Issue of Vaccination Certificate Based on Block Chain," "Digital economy innovating with blockchain" Policy Conference, Apr. 8, 2021.

* cited by examiner 40
41
Off-chain
43
On-chain
Synchronization
Store information associated with issuance of certificate
Verify certificate
Issuer device
10
Issue certificate
User terminal
20
Provide certificate
Service provider terminal
30

FIG. 5

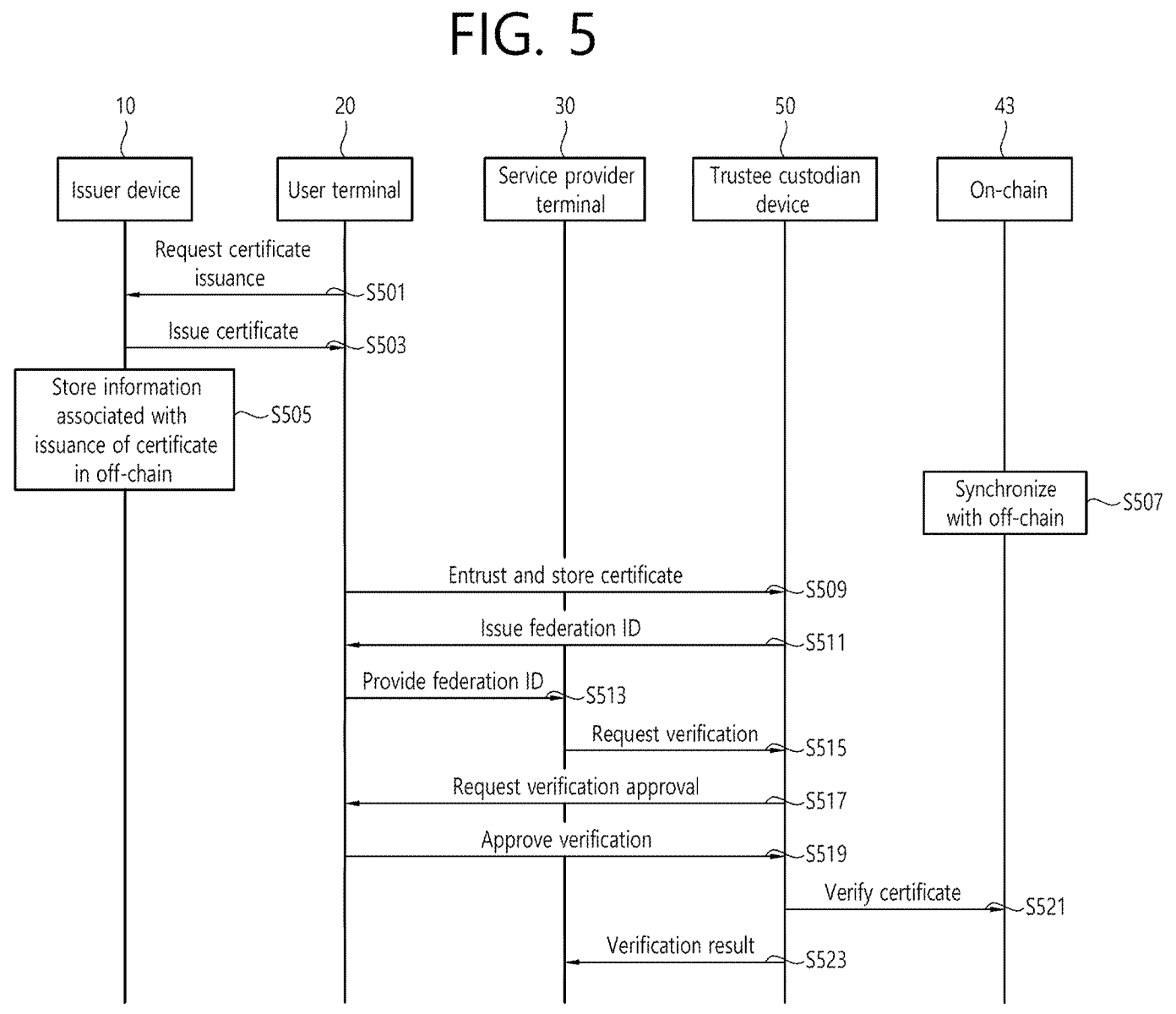

10 Issuer device
20 User terminal
30 Service provider terminal
50 Trustee custodian device
43 On-chain Request certificate issuance S501
Issue certificate S503
Store information associated with issuance of certificate in off-chain S505
Synchronize with off-chain S507
Entrust and store certificate S509
Issue federation ID S511
Provide federation ID S513
Request verification S515
Request verification approval S517
Approve verification S519
Verify certificate S521
Verification result S523

FIG. 9

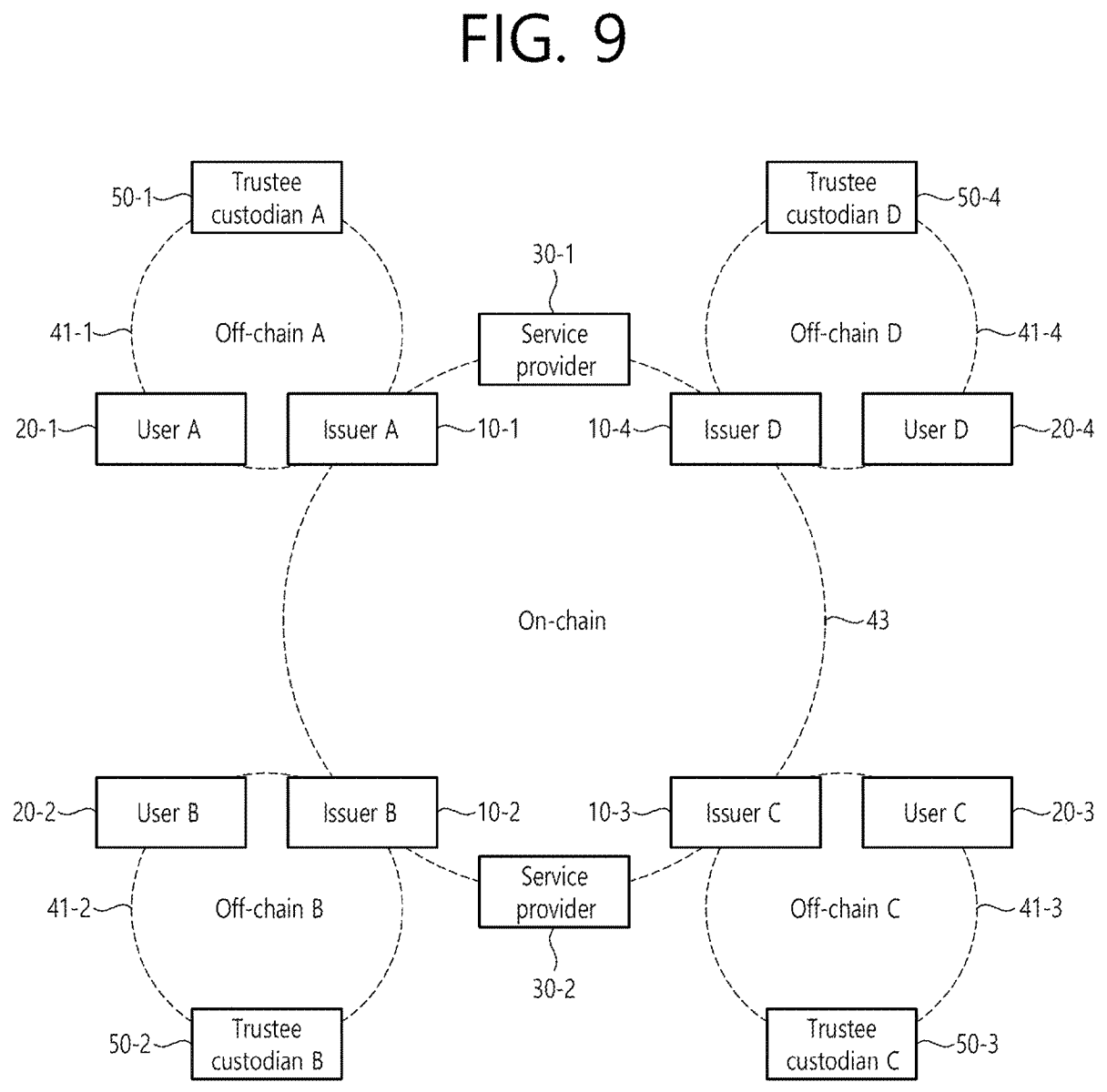

Trustee custodian D
50-4
41-4
Off-chain D
User D
20-4
Issuer D
10-4
43
Service provider
30-1
On-chain
10-1
Issuer A
Trustee custodian A
Off-chain A
User A
50-1
41-1
20-1
User C
20-3
41-3
Off-chain C
Trustee custodian C
50-3
Issuer C
10-3
Service provider
30-2
10-2
Issuer B
Off-chain B
Trustee custodian B
User B
20-2
41-2
50-2

SYSTEM FOR BLOCKCHAIN-BASED CERTIFICATE

CROSS-REFERENCE TO RELATED APPLICATIONS

This application is the National Stage filing under 35 U.S.C. 371 of International Application No. PCT/KR2021/010976 filed on Aug. 18, 2021, which claims the benefit of Korean Patent Application No. 10-2021-0108819 filed on Aug. 18, 2021, the contents of which are all hereby incorporated by reference herein in their entirety.

TECHNICAL FIELD

The present disclosure relates to a system for a certificate based on a block chain.

BACKGROUND ART

As infectious diseases such as COVID-19 are prevalent worldwide, vaccination information, infectious disease testing information, and infectious disease recovery information are available in many multi-use facilities such as airports, tourist attractions, exhibition halls, performance halls, sports stadiums, department stores, and restaurants, etc. are being requested.

Block chain-based certificate systems have been introduced to issue, submit, manage, and verify the various certificates. By introducing a certificate system, it is possible to not only manage vaccination history, infectious disease testing history, and infectious disease treatment history against infectious diseases, but also introduce a single integrated digital certificate by linking with other certificates such as ID cards, boarding passes, and admission tickets.

In this regard, in Korea, online issuance services for vaccination certificates such as COVID-19 are provided on the websites of Government 24 and the Korea Disease Control and Prevention Agency, and the introduction of vaccine passports is being discussed centering on the Central Disaster and Safety Countermeasures Headquarters and the Central Accident Control Headquarters, and a healthcare company has launched a mobile vaccine passport service. Additionally, in 2021, the Korea Disease Control and Prevention Agency is promoting the introduction of a block chain-based vaccine vaccination certificate.

Looking at examples from other countries, in the case of the United States, the federal government is evaluating the feasibility of a digital vaccination certificate worthy of international certification, and International Business Machines Corporation (IBM) has developed a mobile app called "Digital Health Pass". In the case of the European Union (EU), a "Digital Green Pass" issuance system was developed, and the European Commission submitted a plan to introduce a "Digital Green Certificate" to the European Parliament. In the UK, the National Health Service (NHS) implemented a vaccine passport pilot service and issued a vaccination certificate in the form of a mobile application. Meanwhile, Israel has issued "Green Passports" to vaccinated citizens and has entered into mutual recognition agreements for vaccination certificates with Greece, Cyprus, and Estonia. In addition, several countries, including Switzerland, Sweden, Singapore, Thailand, Vietnam, Japan, and China, have introduced or are pursuing the introduction of vaccine passports.

In the conventional block chain-based vaccination certificate system, upon a user's request for certificate issuance, an issuer (e.g., Korea Disease Control and Prevention Agency) issues a certificate and stores a hash value for the certificate in the block chain, and a user enter a QR code into a terminal of a service provider (e.g., airport, restaurant, etc.), and the terminal verifies the certificate by looking up the hash value on the block chain.

However, since the conventional system searches only the hash value, there is a problem in that the system cannot verify the issuer of the certificate or the user who submitted the certificate. In other words, according to the conventional system, it is impossible to verify identity information of the issuer recorded on the certificate, whether the certificate has been forged or altered, and whether the identity information of the certificate submitter and a vaccine recipient recorded on the certificate match.

In addition, in the conventional system, since the certificate is submitted using the QR code, so when multiple certificates must be submitted, the QR code must be entered individually for each certificate, and there is a problem that duplication is easy. As a result, side effects are occurring such as fake vaccination certificates and fake negative test certificates being actively traded on the dark web.

Another problem is that in the conventional system, the user's private key is stored in the user's electronic wallet, so if the private key is lost, the person who stole the private key can steal the user's certificate and when a new private key is generated, the user's electronic signature will also change, so the certificate must be reissued.

DISCLOSURE

Technical Problem

An object of the present disclosure is to provide a system for a certificate based on a block chain, which is capable of verifying an issuer of a certificate and verifying a user who submits the certificate, and makes it difficult to duplicate or steal the certificate by a third person, and software stored in a computer-readable storage medium for an operation thereof.

Another object of the present disclosure is to provide a system for a certificate based on a block chain, which may manage, submit, and verify not only one certificate but also a plurality of certificates in batch, and software stored in a computer-readable storage medium for an operation thereof.

Yet another object of the present disclosure is to provide a system for a certificate based on a block chain, which may effectively protect personal information of a user, and software stored in a computer-readable storage medium for an operation thereof.

However, it is to be understood that the technical problem to be solved by the present disclosure is not limited to the above problems and may be variously extended in a range which does not depart from the spirit and area of the present disclosure.

Technical Solution

A system for a certificate based on a block chain according to an embodiment of the present disclosure includes: an issuer device issuing, in response to a certificate issuance request from a user terminal, a certificate including an electronic signature of an issuer to the user terminal, and storing information associated with the issuance of the certificate in an off-chain, wherein the certificate issuance request includes a first public key of a user and personal information of the user, and the information associated with the issuance of the certificate includes the first public key of the user, the personal information of the user, and a second public key of the issuer; a user terminal providing the certificate including the electronic signature of the user to a service provider terminal through wireless communication in order to verify the certificate; and a service provider terminal verifying the certificate through an on-chain, and at least some of the information associated with the issuance of the certificate stored in the off-chain is synchronized and stored in the on-chain.

According to an aspect, at least some information of the information associated with the issuance of the certificate may include at least one of the first public key of the user, the second public key of the issuer, a first identifier of the user, and a second identifier of the issuer.

According to an aspect, the verifying of the certificate may include verifying the issuer, verifying the user, and verifying whether the certificate is forged or altered.

According to an aspect, the wireless communication may be Bluetooth or Wi-Fi Direct.

According to an aspect, the user terminal may include a wireless communication module for transmitting and receiving data to and from the service provider terminal through a wireless network, and an electronic wallet storing the first private key of the user and the certificate.

A system for a certificate based on a block chain according to an embodiment of the present disclosure includes: an issuer device issuing, in response to a certificate issuance request from a user terminal, a certificate including an electronic signature of an issuer to the user terminal, and storing information associated with the issuance of the certificate in an off-chain, wherein the certificate issuance request includes a first public key of a user and personal information of the user, and the information associated with the issuance of the certificate includes the first public key of the user, the personal information of the user, and a second public key of the issuer; and a service provider terminal receiving the certificate including the electronic signature of the user from the user terminal through wireless communication, and verifying the certificate through an on-chain, and at least some of the information associated with the issuance of the certificate stored in the off-chain is synchronized and stored in the on-chain.

A system for a plurality of certificates based on a block chain according to an embodiment of the present disclosure includes: at least one issuer devices each issuing, in response to respective certificate issuance requests, respective certificates including respective electronic signatures of at least one issuers to the user terminal, and storing respective information associated with the issuance of the respective certificates in respective off-chains, wherein the respective certificate issuance requests include a first public key of the user, personal information of the user, and respective second public keys of the at least one issuers; a user terminal providing at least some certificates among the plurality of certificates including respective electronic signatures of the user to a service provider terminal in batch through wireless communication in order to verify at least some certificates among the plurality of certificates; and a service provider terminal verifying at least some certificates among the plurality of certificates in batch through an on-chain, and at least some of the respective information associated with the issuance of the respective certificates stored in the respective off-chains are synchronized and stored in the on-chain.

According to an aspect, at least some information of the respective information associated with the issuance of the respective certificates may include at least one of the first public key of the user, respective second public keys of the at least one issuers, respective first identifiers of the user, and respective second identifiers of the at least one issuers.

According to an aspect, the verifying of at least some certificates among the plurality of certificates may include verifying the at least one issuers, verifying the user, and verifying whether at least some certificates among the plurality of certificates are forged or altered.

According to an aspect, the wireless communication may be Bluetooth or Wi-Fi Direct.

According to an aspect, the user terminal may include wireless communication module for transmitting and receiving data to and from the service provider terminal through a wireless network, and an electronic wallet storing the first private key of the user and the plurality of certificates.

According to an aspect, the user terminal may include wireless communication module for transmitting and receiving data to and from the service provider terminal through a wireless network, a plurality of electronic wallets storing the respective first private keys of the user and the respective certificates, respectively, wherein at least some of the respective first private keys of the user are different from the remaining first private keys other than at least some of the respective first private keys of the user, and an open application program interface (API) providing an interface for inter-compatibility between the plurality of electronic wallets.

A system for at least one certificates based on a block chain according to an embodiment of the present disclosure includes: at least one issuer devices each issuing, in response to respective certificate issuance requests, respective certificates including respective electronic signatures of at least one issuers to the user terminal, and storing respective information associated with the issuance of the respective certificates in respective off-chains, wherein the respective certificate issuance requests include a first public key of the user, personal information of the user, and respective second public keys of the at least one issuers; a user terminal transmitting, in order to entrust and store the respective first private keys of the user and the respective certificates in a trustee custodian, the respective first private keys of the user and the respective certificates to a trustee custodian device, and receiving a federation ID from the trustee custodian device in response to the transmission, and providing the federation ID to a service provider terminal through wireless communication in order to verify at least some of the at least one certificates; a service provider terminal transmitting a verification request for at least some of the at least one certificates by transmitting the federation ID to the trustee custodian device; and a trustee custodian device transmitting a verification approval request to the user terminal in response to the verification request from the service provider terminal, and when receiving verification approval from the user terminal, verifying at least some certificates among at least one certificates in batch through an on-chain, and transmitting a result of the batch verification, and at least some of the respective information associated with the issuance of the respective certificates stored in the respective off-chains are synchronized and stored in the on-chain.

According to an aspect, least some information of the respective information associated with the issuance of the respective certificates may include at least one of the first public key of the user, respective second public keys of the at least one issuers, respective first identifiers of the user, and respective second identifiers of the at least one issuers.

According to an aspect, the verifying of at least some certificates among the at least one certificates may include verifying the at least one issuers, verifying the user, and verifying whether at least some certificates among the at least one certificates are forged or altered.

According to an aspect, the wireless communication may be Bluetooth or Wi-Fi Direct.

According to an aspect, the user terminal may include a wireless communication module for transmitting and receiving data to and from the service provider terminal through a wireless network, and an electronic wallet storing the federation ID.

In software stored in a computer readable storage medium, when the software is installed and executed in a user terminal, the user terminal is configured to: transmit a certification issuance request to an issuer device, wherein the certificate issuance request includes a first public key of a user and personal information of the user; be issued with a certificate including an electronic signature of an issuer from the issuer device, wherein the issuer device stores information associated with the issuance of the certificate in an off-chain, and the information associated with the issuance of the certificate includes the first public key of the user, the personal information of the user, and a second public key of the issuer; and provide certificate including the electronic signature of the user to a service provider terminal through wireless communication in order to verify the certificate, wherein the service provider terminal verifies the certificate through an on-chain, and at least some of the information associated with the issuance of the certificate stored in the off-chain is synchronized and stored in the on-chain.

According to an aspect, the software may additionally allow the user terminal to store the first private key of the user and the certificate in an electronic wallet.

In software stored in a computer readable storage medium, when the software is installed and executed in a user terminal, the user terminal is configured to: transmit respective certification issuance requests to at least one issuer devices in order to be issued with a plurality of certificates, wherein the respective certificate issuance requests include a first public key of a user and personal information of the user; be issued with respective certificates including respective electronic signatures of at least one issuers from the at least one respective issuer devices, wherein the at least one respective issuer devices store respective information associated with the issuance of the respective certificates in an off-chain, and the respective information associated with the issuance of the respective certificates includes the first public key of the user, the personal information of the user, and respective second public keys of the at least one issuers; and provide at least some certificates among the plurality of certificates including the respective electronic signatures of the user to a service provide terminal through wireless communication in batch in order to verify at least some of the plurality of certificates, wherein the service provider terminal verifies at least some of the plurality of certificates in batch through an on-chain, and at least some of the respective information associated with the issuance of the respective certificates stored in the respective off-chains are synchronized and stored in the on-chain.

According to an aspect, the software may additionally allow the user terminal to store the first private key of the user and the plurality of certificates in an electronic wallet.

According to an aspect, the software may additionally allow the user terminal to store the respective first private keys of the user and the respective certificates, wherein at least some of the respective first private keys of the user are different from the remaining first private keys other than at least some of the respective first private keys of the user, and the user terminal may include an open application program interface (API) providing an interface for inter-compatibility between the plurality of electronic wallets.

In software stored in a computer readable storage medium, when the software is installed and executed in a user terminal, the user terminal is configured to: transmit respective certification issuance requests to at least one issuer devices in order to be issued with at least one certificates, wherein the respective certificate issuance requests include a first public key of a user and personal information of the user; be issued with respective certificates including respective electronic signatures of at least one issuers from the at least one respective issuer devices, wherein the at least one respective issuer devices store respective information associated with the issuance of the respective certificates in an off-chain, and the respective information associated with the issuance of the respective certificates includes the first public key of the user, the personal information of the user, and respective second public keys of the at least one issuers; transmit, in order to entrust and store the respective first private keys of the user and the respective certificates in a trustee custodian, the respective first private keys of the user and the respective certificates to a trustee custodian device, and receive a federation ID from the trustee custodian device in response to the transmission, and provide the federation ID to a service provider terminal through wireless communication in order to verify at least some of the at least one certificates, wherein the service provider terminal transmits a verification request for at least some of the at least one certificates by transmitting the federation ID to the trustee custodian device; and transmit a verification approval to the trustee custodian device in response to a verification approval request from the trustee custodian device, wherein the trustee custodian device verifies at least some of the at least one certificates in batch through an on-chain when receiving the verification approval from the user terminal, and the service provider terminal transmits a result of the batch verification, and at least some of the respective information associated with the issuance of the respective certificates stored in the respective off-chains are synchronized and stored in the on-chain.

According to an aspect, the software may additionally allow the user terminal to store the federation ID in an electronic wallet.

Advantageous Effects

The disclosed technology may have the following effects. However, since it is not meant that a specific embodiment should include all of the following effects or merely include the following effects, the scope of the disclosed technology is not to be construed as being limited thereby.

According to the system for a certificate based on a block chain according to the embodiments of the present disclosure described above, an issuer of a certificate can be verified and a user who submits the certificate can be verified.

Further, according to the system for a certificate based on a block chain according to the embodiments of the present disclosure, not only one certificate but also a plurality of certificates can be managed, submitted, and verified in batch, and a time required for verifying the certificate is shortened to increase user convenience.

Further, according to the system for a certificate based on a block chain according to the embodiments of the present disclosure, personal information of a user can be effectively protected, and even though the user loses a private key, an original certificate can be used by a simple procedure without being reissued with a new certificate.

DESCRIPTION OF DRAWINGS

FIG. 5 schematically illustrates an operation of the system of FIG. 4.

FIG. 9 is a schematic view illustrating a participant for each chain in the system for a certificate based on a block chain according to the embodiments of the present disclosure.

DETAILED DESCRIPTION OF MAIN ELEMENTS

Figure 1:
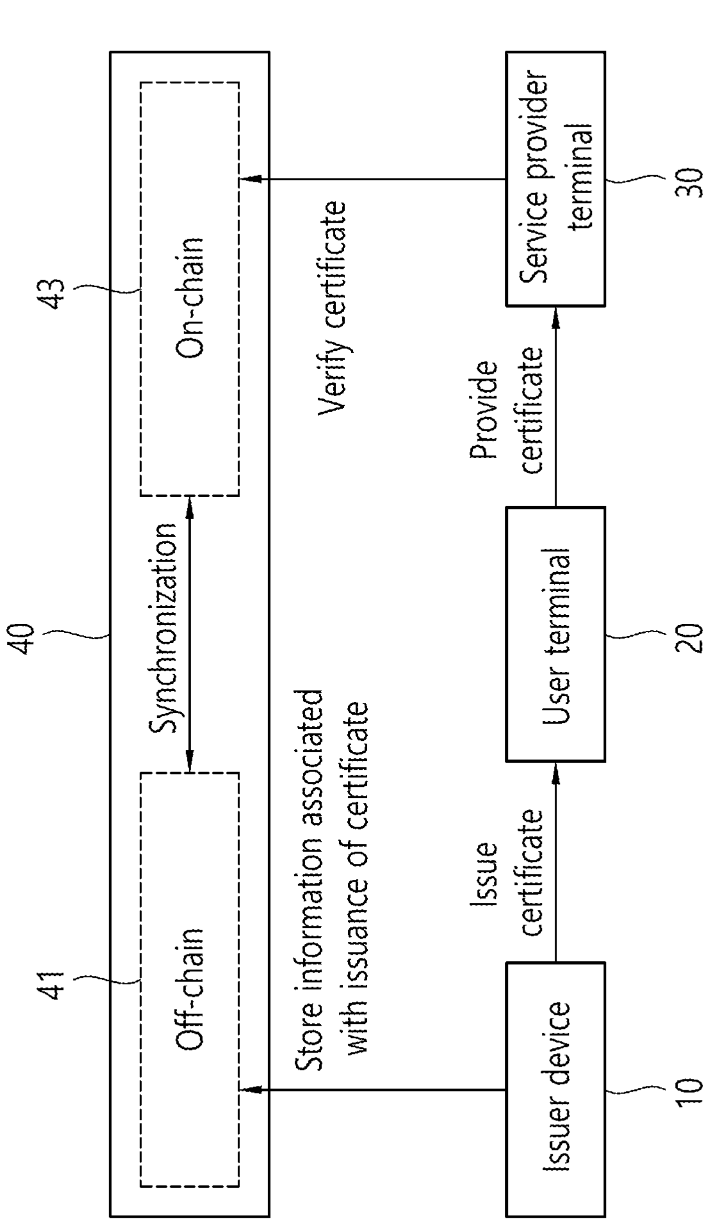
FIG. 1 is a block diagram illustrating a configuration of a system for a certificate based on a block chain according to an embodiment of the present disclosure.

10: Issuer device
20: User terminal
30: Service provider terminal
41: Off-chain
43: On-chain
50: Trustee custodian device

Mode for Disclosure

Hereinafter, preferred embodiments of the present disclosure will be described in detail with reference to the accompanying drawings. A detailed description to be disclosed below together with the accompanying drawing is to describe embodiments of the present disclosure and not to describe a unique embodiment for carrying out the present disclosure. The detailed description below includes details in order to provide a complete understanding. However, those skilled in the art know that the present disclosure can be carried out without the details. The present disclosure may have various modifications and various embodiments and specific embodiments will be illustrated in the drawings and described in detail.

A method for manufacturing a low friction member according to an embodiment of the present disclosure will be described in detail with reference to the accompanying drawings.

Terms including as first, second, and the like are used for describing various components, but the components should not be limited by the terms. The terms are used only to discriminate one component from another component. For example, a first component may be referred to as a second component, and similarly, the second component may be referred to as the first component without departing from the scope of the present disclosure.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

Terms used in the present application are used only to describe specific embodiments, and are not intended to limit the present disclosure. A singular form includes a plural form if there is no clearly opposite meaning in the context. In the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, with reference to the accompanying drawings, preferred embodiments of the present disclosure will be described clearly and in detail so that those skilled in the art can easily implement the present disclosure.

FIG. 1 is a block diagram illustrating a configuration of a system for a certificate based on a block chain according to an embodiment of the present disclosure.

Referring to FIG. 1, a system for a certificate based on a block chain according to an embodiment of the present disclosure includes an issuer device 10, a user terminal 20, a service provider terminal 30, and a trust anchor 40, and the trust anchor 40 includes an off-chain 41 and an on-chain 43.

The system in FIG. 1 is an example in which one issuer issues one certificate to one user, the user submits one certificate to a service provider, and the service provider requests verification of one certificate to the on-chain.

The issuer device 10 is a device used for the issuer to issue a certificate and store information related to the issuance of the certificate in the off-chain. For example, the certificate may include not only certificates related to infectious diseases such as vaccination certificates, infectious disease test certificates, and infectious disease recovery certificates, but also identification cards such as passports, resident registration cards, or driver's licenses, boarding passes for aircraft or ships, and admission tickets to sports games or performances, etc. The issuer is an individual or organization qualified to issue the certificate, and for example, the issuer may correspond to the Korea Disease Control and Prevention Agency, which may issue a vaccination certificate in Korea. For example, the issuer device 10 may be a computer, server, or cloud used by the issuer.

The user terminal 20 is a device in which software may be installed and executed and is used by the user to store the certificate and submit the certificate to the service provider. For example, the user terminal 20 may be constituted by a smartphone, a smart pad, a smart watch, a tablet, PDA (Personal Digital Assistant), or a dedicated terminal, and may be other arbitrary devices that may store the certificate and transmit/receive data to/from the terminal through a wireless network. The user terminal 20 may perform operations described below by software which the issuer provides by an electronic method (e.g., download through a mobile application platform such as AppStore or Google Play).

The service provider terminal 30 as a device in which the soft may be installed and executed is a device used for the service provider to verify the certificate submitted by the user. For example, the service provider terminal 30 may be constituted by a smartphone, a smart pad, a smart watch, a tablet, PDA (Personal Digital Assistant), or a dedicated terminal, and may be other arbitrary devices that may store the certificate and transmit/receive data to/from the terminal through the wireless network. The service provider terminal 20 may perform operations described below by software which the issuer provides by an electronic method (e.g., download through a mobile application platform such as AppStore or Google Play).

The off-chain 41 is related to a block chain system, but operates outside of the block chain system, and data stored in the off-chain is shared only with a participating node belonging to the same jurisdiction, and a transaction is recorded outside the block-chain network. Here, the transaction means that various actions are included in addition to the transaction.

The on-chain 43 records transaction details (data) inside the block chain system, and the data stored in the on-chain is shared by all participating nodes. The on-chain may be constituted by public and permissioned block chains that may be used by anyone, but authorize the operation and management of the nodes. At least some of the data stored in the off-chain 41 is synchronized and stored in the on-chain 43.

Figure 2:
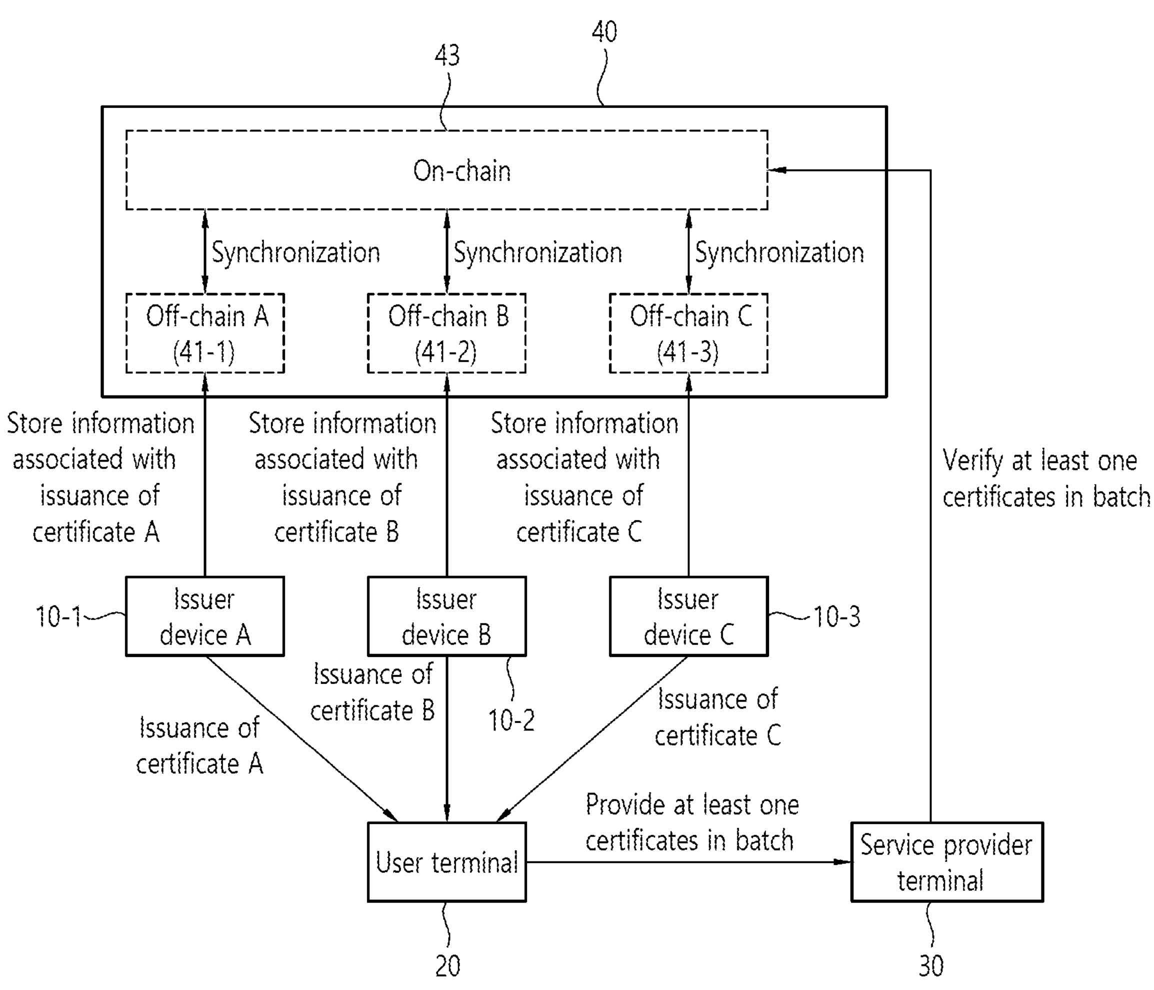
FIG. 2 is a block diagram illustrating a configuration of a system for a plurality of certificates based on a block chain according to an embodiment of the present disclosure.

FIG. 2 is a block diagram illustrating a configuration of a system for a plurality of certificates based on a block chain according to an embodiment of the present disclosure.

Referring to FIG. 2, the system for a plurality of certificates based on a block chain includes one or more issuer devices 10-1, 10-2, and 10-3, the user terminal 20, the service provider terminal 30, and the trust anchor 40, and the trust anchor 40 includes one or more off-chains 41-1, 41-2, and 41-3 and the on-chain 43.

Unlike in the system in FIG. 1, the system of FIG. 2 is an example in which one or more issuers issue one or more certificates to one user, the user submits one or more certificates to the service provider in batch, and the service provider requests batch verification of one or more certificates to the on-chain. For example, the user may be issued with certificate A (e.g., passport) from issuer A (e.g., Ministry of Foreign Affairs), certificate B (e.g., vaccination certificate) from issuer B (e.g., Korea Disease Control and Prevention Agency), and certificate C (e.g., airline ticket) from issuer C (e.g. airline), and submit certificates A, B, and C to the service provider (e.g., airport) in batch, and the service provider (e.g., airport) may verify certificates A, B, and C in batch through the on-chain, and when the verification is completed, provide services (e.g. boarding an airplane) to the user.

In the system of FIG. 2, basic operations of the issuer devices 10-1, 10-2, and 10-3, the user terminal 20, the service provider terminal 30, the off-chains 41-1, 41-2, and 41-3, and the on-chain are the same as those of the system in FIG. 1, so only differences will be described below.

One or more issuer devices 10-1, 10-2, and 10-3 are devices for respective issuers to issue respective certificates, and store respective information association with issuance of the respective certificates in respective off-chains. In other words, issuer device A (10-1) issues certificate A and stores information associated with the issuance of certificate A in off-chain A (41-1), issuer device B (10-2) issues certificate B and stores information associated with the issuance of certificate B in off-chain B (41-2), and issuer device C (10-3) issues certificate C and stores information associated with the issuance of certificate C in off-chain C (41-3).

The user terminal 20 is a device in which software may be installed and executed and is used for the user to store one or more certificates and submit one or more certificates to the service provider in batch.

The service provider terminal 30 as a device in which the software may be installed and executed is a device used for the service provider to verify one or more certificates submitted by the user in batch.

The respective off-chains 41-1, 41-2, and 41-3 are shared only by the respective issuer devices 10-1, 10-2, and 10-3.

The on-chain 43 synchronizes and stores at least some data among data stored in the respective off-chains 41-1, 41-2, and 41-3. In other words, the on-chain 43 synchronizes and stores at least some of the information associated with the issuance of certificate A stored in off-chain A (41-1), at least some of the information associated with the issuance of certificate B stored in off-chain B (41-2), and at least some of the information associated with the issuance of the certificate C stored in off-chain C (41-3).

FIG. 2 illustrates that three issuer devices 10-1, 10-2, and 10-3 issue three certificates, but there may be more or fewer issuer devices therethan, and the number of issuer devices 10-1, 10-2, and 10-3 may be different from the number of certificates. That is, one issuer device 10 may also issue a plurality of certificates.

Hereinafter, with reference to FIG. 3, the operation of the system in FIG. 1 is described in detail, and then the operation of the system in FIG. 2 is described.

Figure 3:
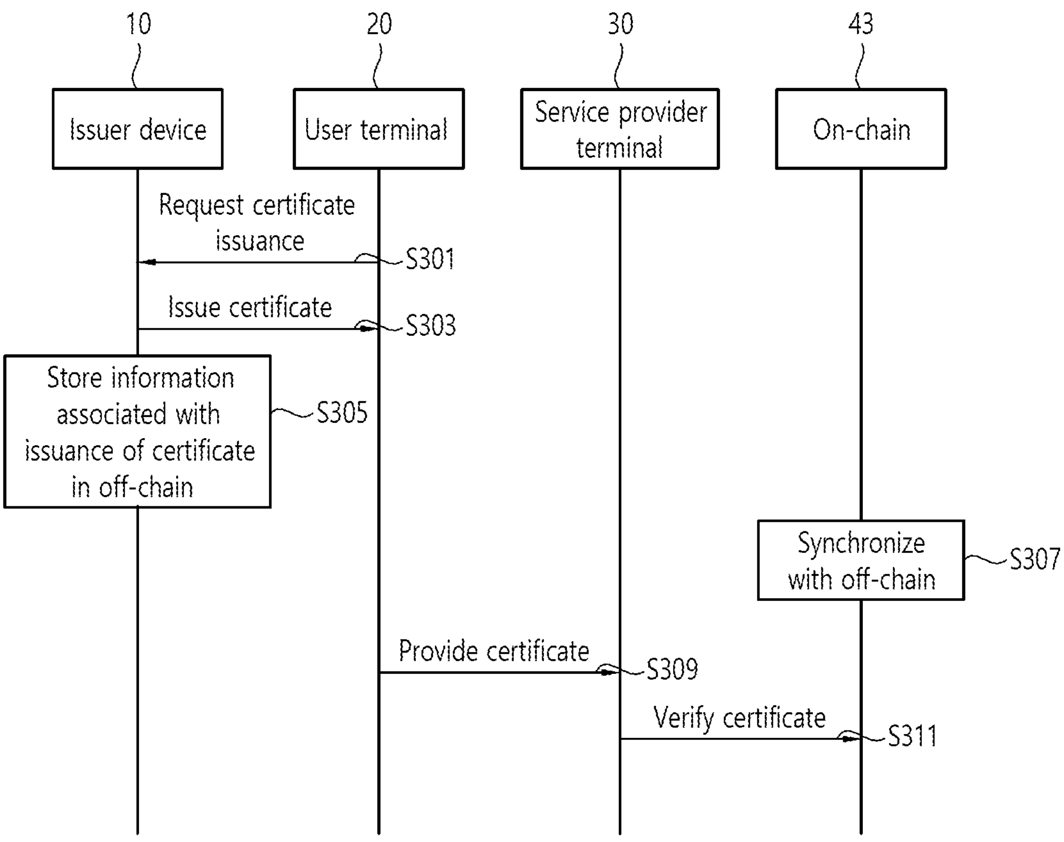
FIG. 3 schematically illustrates an operation of the system of FIG. 1 or 2.

FIG. 3 schematically illustrates an operation of the system of FIG. 1 or 2.

Referring to FIG. 3, in the system of FIG. 1, the user terminal 20 transmits a certificate issuance request to the issuer device 10 (S301). The certificate issuance request includes a first public key of the user and personal information of the user. The personal information of the user may include, for example, an identification photo, a name, and/or date of birth of the user.

The issuer device 10 issues a certificate containing an electronic signature of the issuer to the user terminal in response to the certificate issuance request from the user terminal 20 (S303), and stores information related to the issuance of the certificate in the off-chain 41 (S305). The information associated with the issuance of the certificate includes a public key of the user, the personal information of the user, and a public key of the issuer.

At least some of the information associated with the issuance of the certificate stored in the off-chain 41 is synchronized and stored in the on-chain 43 (S307). The information stored in the on-chain 43 may include at least one of the public key of the user, the public key of the issuer, an identifier of the user, and an identifier of the issuer. For example, the identifier of the user and the identifier of the issuer may be a decentralized identifier (ID) of the user and a decentralized ID of the issuer, respectively.

The personal information of the user among the information associated with the issuance of the certificate stored in the off-chain 41 is not stored in the on-chain 43. In other words, the on-chain 43 stores only minimum information required for verifying the certificate by synchronization with the off-chain 41.

For example, the certificate may include the identification card, the boarding pass, the vaccination certificate, the infectious disease test certificate, and the infectious disease recovery certificate, and besides, may also include other certificates.

The identification card may be a passport, a resident registration card, a driver's license, etc. through which the identity of the user may be confirmed, and may include data such as the personal information of the user, the electronic signature of the issuer, the electronic signature of the user, etc.

The boarding pass which is required when boarding an aircraft or ship may include data such as issuer information, boarding information (e.g., departure point, destination, seat, departure date, arrival date, etc.), the personal information of the user, the electronic signature of the issuer, the electronic signature of the user, etc.

The vaccination certificate which is used to confirm a vaccination history to prevent the infectious diseases may include data such as the issuer information, vaccination information (e.g., infectious disease name, vaccine name, vaccination location, vaccination date, etc.), the personal information of the user, the electronic signature of the issuer, the electronic signature of the user, etc.

The infectious disease test certificate which is intended to confirm the infectious disease test result may include data such as the issuer information, an infectious disease test result (e.g., positive or negative), the personal information of the user, the electronic signature of the issuer, the electronic signature of the user, etc.

The infectious disease recovery certificate which is intended to confirm whether the infectious disease is treated and recovered may include data such as the issuer information, infectious disease recovery information (e.g., a treatment institution name, whether recovery of the infections disease is completed, etc.), the personal information of the user, the electronic signature of the issuer, an electronic signature of a submitter, etc.

In the system according to the embodiments of the present disclosure, various types of certificates may be processed in addition to the above-described certificates.

The user terminal 20 stores the private key of the user and the certificate in an electronic wallet. The user terminal 20 may be configured in various types depending on the form of the electronic wallet, which will be described later with reference to FIGS. 6 to 8.

The user terminal 20 provides a certificate including the electronic signature of the user to the service provider terminal 30 through wireless communication in order to verify the certificate (S309). The wireless communication may preferably adopt short-range wireless communication such as Bluetooth or Wi-Fi Direct.

When a plurality of certificates are intended to be verified, such as the ID card, the vaccination certificate, or the airline ticket, by requesting verification of the certificates through the wireless communication rather than the QR code, the plurality of certificates may be submitted in batch instead of submitting each QR code for each certificate, and it may be rapidly compared whether respective identity information written on the plurality of certificates matches each other, so the convenience of the user may be significantly enhanced. Further, in a QR code scheme, it is very easy to copy or steal the certificate, such as capturing the QR code, whereas submitting the certificate through the wireless communication makes it difficult to copy or steal the certificate.

The service provider terminal 30 verifies the certificate through the on-chain 43 (S311). Specifically, the service provider terminal 30 may access the on-chain 43 and verify the certificate using the information associated with the issuance of the certificate stored in the on-chain 43. For example, the service provider terminal 30 may verify the certificate using the public key of the user and the public key of the issuer stored in the on-chain 43.

In this case, verifying the certificate may include verifying the issuer, verifying the user, and verifying whether the certificate is forged or altered. In other words, the service provider terminal 30 may verify the identity of the issuer using the public key and/or identifier of the issuer stored in the on-chain 43, verify whether the data included in the certificate is forged or altered, and verify whether the identity of the user and the personal information of the user written in the certificate match each other by using the public key and/or the identifier of the user stored in the on-chain 43.

Only operations of the system in FIG. 2 which are different from the operations of the system in FIG. 1 are described, and a description of operations which are the same as the operations of the system in FIG. 1 is omitted.

Referring to FIG. 3, in the system of FIG. 2, the user terminal 20 transmits respective certificate issuance requests to one or more issuer devices 10 (S301). The respective certificate issuance requests may include a public key of the user and personal information of the user.

One or more respective issuer devices 10 issue respective certificates containing respective electronic signatures of one or more issuers to the user terminal in response to the respective certificate issuance requests from the user terminal 20 (S303), and store respective information associated with the issuance of the respective certificates in the off-chain 41 (S305). The respective information associated with the issuance of the respective certificates includes the public key of the user, the personal information of the user, and respective public keys of one or more issuers.

At least some of the respective information associated with the issuance of the respective certificates stored in the respective off-chains 41 is synchronized and stored in the on-chain 43 (S307). The information stored in the on-chain 43 may include at least one of the public key of the user, the respective public keys of one or more issuers, the identifier of the user, and respective identifiers of one or more issuers.

However, the personal information of the user among the respective information associated with the issuance of the respective certificates stored in the respective off-chains 41 is not stored in the on-chain 43. In other words, the on-chain 43 stores only minimum information required for verifying the certificate by synchronization with the respective off-chains 41.

The user terminal 20 stores respective private keys and respective certificates of the user in the electronic wallet. At least some of the respective private keys of the user may be different from the remaining private keys other than at least some private keys among the respective private keys of the user. In other words, the user may also perform the electronic signature using a different private key for each certificate, or also perform the electronic signature using one private key in all certificates. Additionally, the user may perform the electronic signature in some certificates among a plurality of certificates using one private key, and also perform the electronic signature using other private keys different from the one private key in the remaining certificates.

There may be various types of user terminals 20 to depending on the form of the electronic wallet, which will be described later with reference to FIGS. 6 to 8.

The user terminal 20 provides at least some certificates among the plurality of certificates including respective electronic signatures of the user to the service provider terminal 30 in batch for the wireless communication in order to verify at least some certificates among the plurality of multiple certificates (S309).

The service provider terminal 30 verifies at least some certificates among the plurality of certificates in batch through the on-chain 43.

Figure 4:
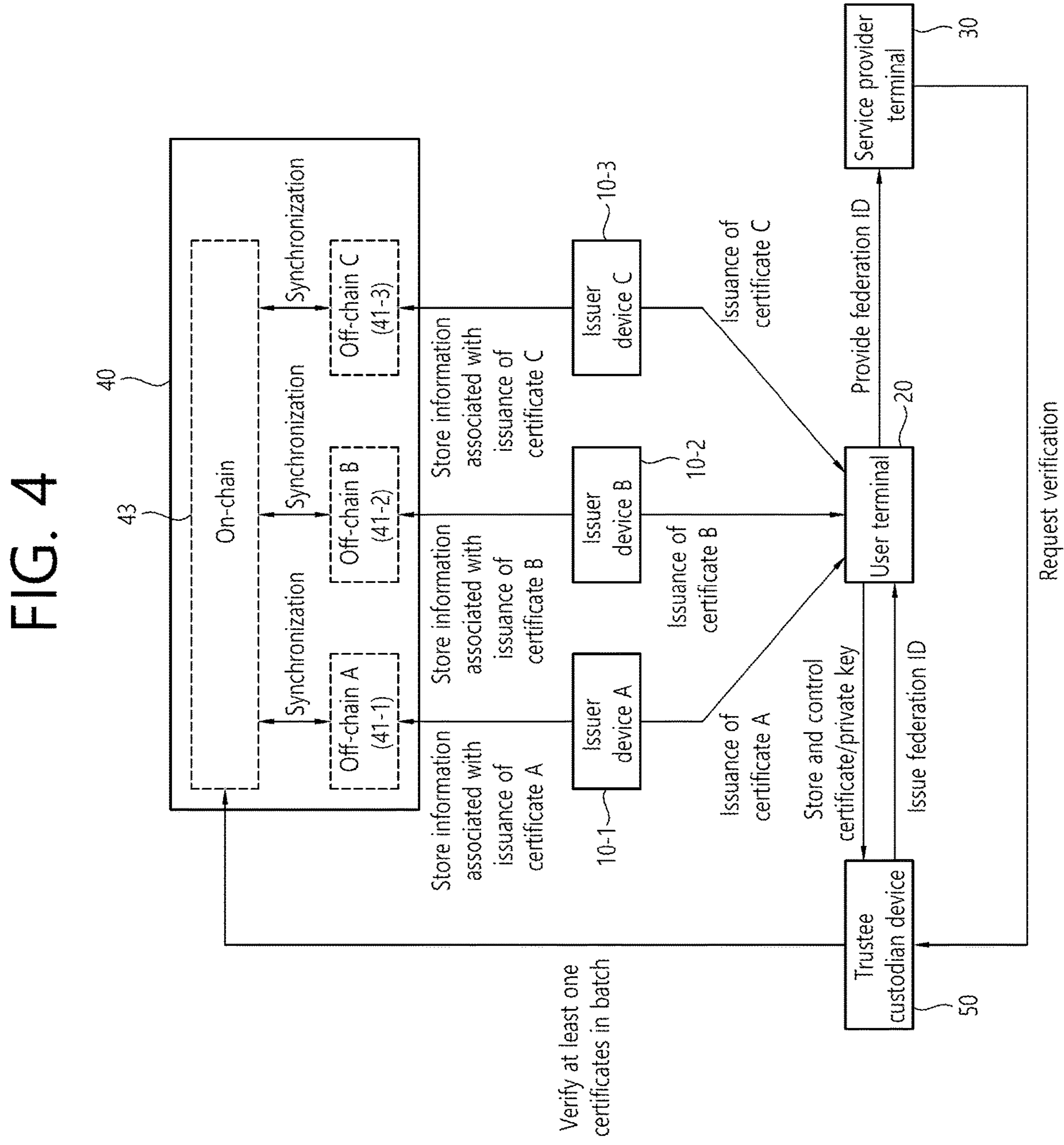
FIG. 4 is a block diagram illustrating a configuration of a system for one or more certificates based on a block chain according to an embodiment of the present disclosure.

FIG. 4 is a block diagram illustrating a configuration of a system for one or more certificates based on a block chain according to an embodiment of the present disclosure.

Referring to FIG. 4, unlike the systems of FIGS. 1 and 2, the system of FIG. 4 further includes a trustee custodian device 50.

The trustee custodian device 50 is a device used for a trustee custodian to entrust and store the private key and the certificate of the user, and perform verification for the certificate on behalf of the service provider according to a verification request of the service provider. For example, the trustee custodian device 50 may be a computer, server, or cloud used by a trustee custodian.

In a conventional block chain-based certificate system, the public key of the user is stored in the block chain and the private key of the user is stored in the electronic wallet of the user. Likewise, the issuer also stores the public key in the block chain and performs the electronic signature by using the private key stored in the issuer device to prove that the issuer himself/herself issues the corresponding certificate. However, when the user loses the private key, the user must be reissued with the private key and the certificate of the user, and a person who steals the private key of the user may also steal the certificate of the corresponding user.

In the system of FIG. 4, such highly important data is not stored in the electronic wallet (e.g., smartphone) of the user, but is entrusted and stored in a trustable third institution, and only a federation ID issued by the trustee custodian is stored in the electronic wallet of the user. Therefore, even if the user loses the electronic wallet, the user may continue to use the certificate by reissuing only the federation ID from the trustee custodian without the need to reissue the private key and the certificate.

However, in the system of FIG. 4, the trustee custodian must be under the control of the user. In other words, when the trustee custodian receives the certificate verification request (e.g., from the service provider), the trustee custodian may notify the corresponding fact to the user, and only when the trustee custodian obtains verification approval from the user, the trustee custodian may verify the certificate (e.g., to the service provider).

Hereinafter, the operation of the system in FIG. 4 will be described in detail with reference to FIG. 5.

FIG. 5 schematically illustrates an operation of the system of FIG. 4.

Referring to FIG. 5, in the system of FIG. 4, the user terminal 20 transmits respective certificate issuance requests to one or more respective issuer devices 10 (S501). The respective certificate issuance requests may include a public key of the user and personal information of the user.

One or more respective issuer devices 10 issue respective certificates containing respective electronic signatures of one or more issuers to the user terminal 20 in response to the respective certificate issuance requests from the user terminal 20 (S503), and stores respective information associated with the issuance of the respective certificates in the off-chain 41 (S505). The respective information associated with the issuance of the respective certificates includes the public key of the user, the personal information of the user, and respective public keys of one or more issuers.

At least some of the respective information associated with the issuance of the respective certificates stored in the respective off-chains 41 is synchronized and stored in the on-chain 43 (S507). The information stored in the on-chain 43 may include at least one of the public key of the user, the respective public keys of one or more issuers, the identifier of the user, and respective identifiers of one or more issuers.

However, the personal information of the user among the respective information associated with the issuance of the respective certificates stored in the respective off-chains 41 is not stored in the on-chain 43. In other words, the on-chain 43 stores only minimum information required for verifying the certificate by synchronization with the respective off-chains 41.

In order to entrust and store respective private keys and respective certificates of the user in the trustee custodian, the user terminal 20 transmits, to the trustee custodian device 50, respective certificates including respective private keys and of the user and respective electronic signatures of the user (S509), and the trustee custodian device 50 transmits a federation ID to the user terminal 20 in response to transmission (S511).

The user terminal 20 stores the federation ID in the electronic wallet. This will be described later with reference to FIG. 8.

The user terminal 20 provides the federation ID to the service provider terminal 30 through wireless communication in order to verify at least some certificates among one or more certificates (S513).

The service provider terminal 30 transmits a verification request for at least some certificates among one or more certificates by transmitting the federation ID to the trustee custodian device (S515).

The trustee custodian device 50 requests the verification approval to the user terminal in response to the verification request from the service provider terminal (S517), and when receiving the verification approval from the user terminal (S519), the trustee custodian device 50 verifies at least some certificates among one or more certificates in batch through the on-chain 43 (S521), and the service provider terminal transmits a result of the batch verification (S523).

Hereinafter, three types of user terminals 20 that may be used in the systems according to the embodiments of the present disclosure will be described with reference to FIGS. 6 to 8.

Figure 6:
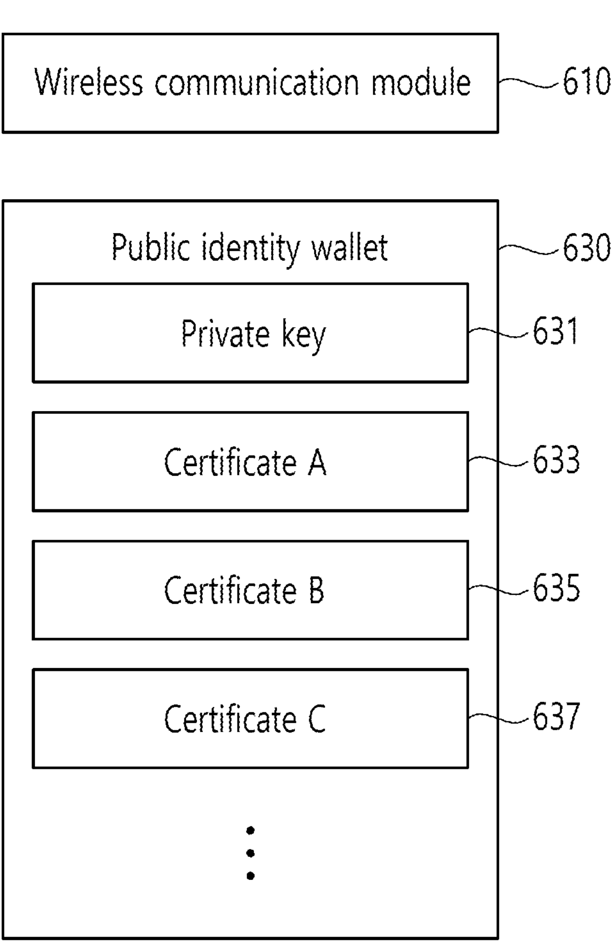
FIG. 6 is a block diagram illustrating a configuration of a user terminal of a first type.

FIG. 6 is a block diagram illustrating a configuration of a user terminal of a first type.

Referring to FIG. 6, the user terminal 600 includes a wireless communication module 610 and a public identity wallet 630.

The wireless communication module 610 transmits and receives data to and from the service provider terminal 30 through a wireless network. The wireless communication module 610 may use short-range wireless communication such as Bluetooth or Wi-Fi Direct. The user terminal 600 may transmit the private key and one or more certificates of the user to the service provider terminal 30 using the wireless communication module 610.

The public identity wallet 630 is an electronic wallet that stores a private key 631 and one or more certificates 633, 635, and 637 of the user. The private key 631 of the user may be used for performing the electronic signature of the user in one or more certificates 633, 635, and 637.

Therefore, the user terminal 600 may store one or more certificates 633, 635, and 637, each containing the same user's electronic signature signed using the private key 631 of the user, in the public identity wallet 630.

Figure 7:
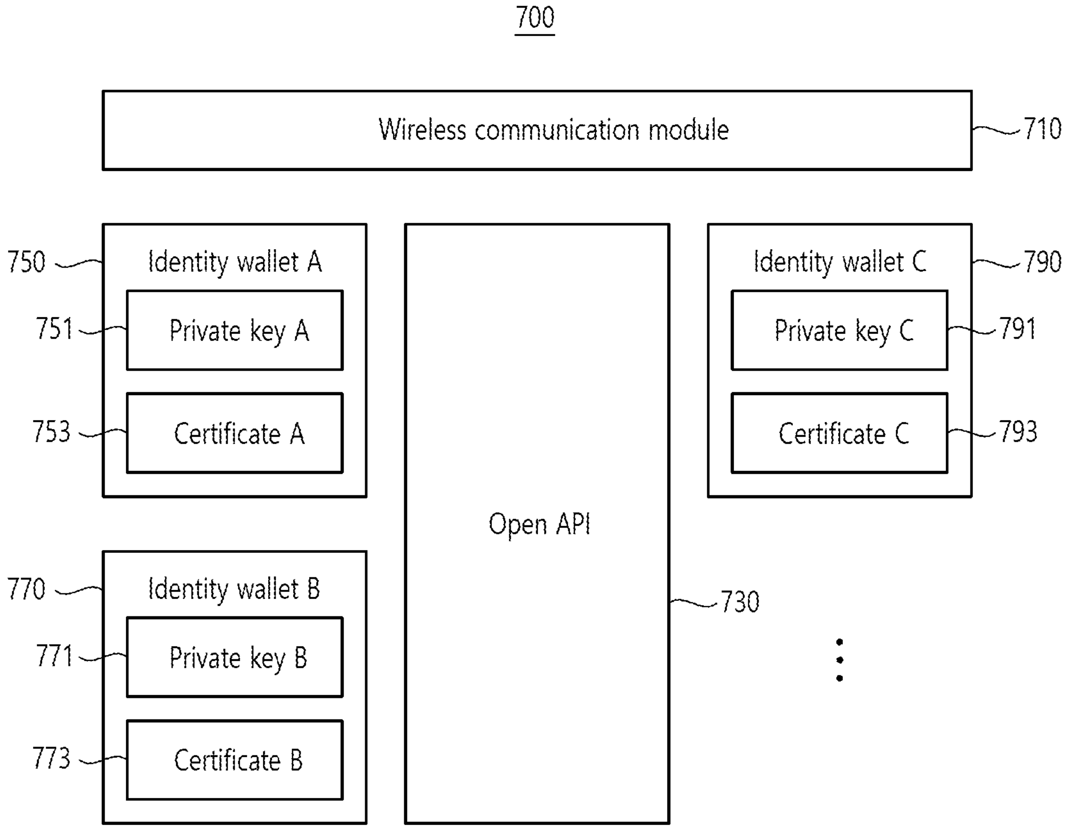
FIG. 7 is a block diagram illustrating a configuration of a user terminal of a second type.

FIG. 7 is a block diagram illustrating a configuration of a user terminal of a second type.

Referring to FIG. 7, the user terminal 700 includes a wireless communication module 710, an open application program interface (API) 730, and one or more identity wallets 750, 770, and 790.

The wireless communication module 710 transmits and receives data to and from the service provider terminal 30 through a wireless network. The wireless communication module 710 may use short-range wireless communication such as Bluetooth or Wi-Fi Direct. The user terminal 700 may transmit one or more private keys and one or more certificates of the user to the service provider terminal 30 using the wireless communication module 710.

The open API 730 provides an interface for inter-compatibility between one or more identity wallets 750, 770, and 790. Since the respective identity wallets 750, 770, and 790 may be generated by different issuers, the inter-compatibility may be impossible between the identity wallets. The open API 730 may allow the user terminal 700 to transmit one or more certificates to the service provider terminal in batch.

The respective identity wallets 750, 770, and 790 are electronic wallets that store any one of one or more private keys 751, 771, and 791 of the user and store any one of one or more certificates 753, 773, and 793. At least some of one or more private keys 751, 771, and 791 of the user may be different from the remaining private keys other than at least some private keys among one or more private keys of the user. In other words, one or more private keys 751, 771, and 791 of the user may be used to perform the electronic signature of the user on one or more certificates 633, 635, and 637, and in this case, all electronic signatures of the user included in the respective certificates may be signed by the same private key, and all electronic signatures may be signed by different private keys, or some electronic signatures may be signed by the same private key and the remaining electronic signatures may be signed by different private keys.

Therefore, the user terminal 700 stores one or more respective certificates 753, 773, and 793 in separate electronic wallets 750, 770, and 790. For example, the user terminal 700 may store certificate A (e.g., passport) issued by issuer A (e.g., Ministry of Foreign Affairs) in identity wallet A (750) generated by issuer A, store certificate B (e.g., vaccination certificate) issued by issuer B (e.g., Korea Disease Control and Prevention Agency) in identity wallet B (750) generated by issuer B, and store certificate C (e.g., airline ticket) issued by issuer C (e.g., airline) in identity wallet C (790) generated by issuer C.

Figure 8:
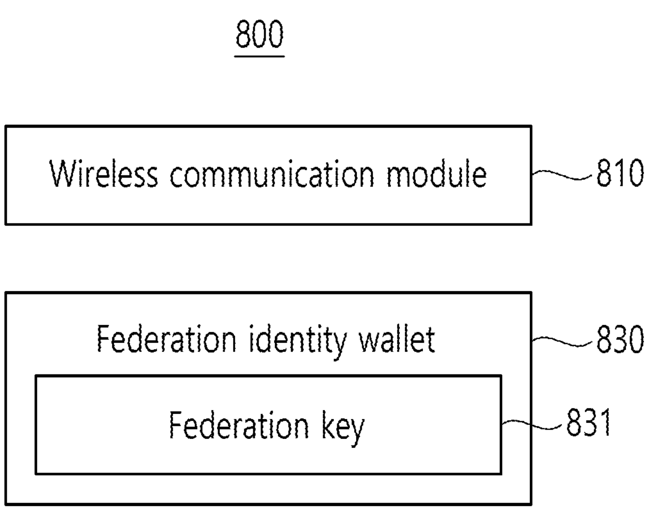
FIG. 8 is a block diagram illustrating a configuration of a user terminal of a third type.

FIG. 8 is a block diagram illustrating a configuration of a user terminal of a third type.

Referring to FIG. 8, the user terminal 800 includes a wireless communication module 810 and a federation ID wallet 830.

The wireless communication module 810 transmits and receives data to and from the service provider terminal 30 through a wireless network. The wireless communication module 810 may use short-range wireless communication such as Bluetooth or Wi-Fi Direct. The user terminal 800 may transmit a federation ID 831 to the service provider terminal 30 using the wireless communication module 810.

The federation ID wallet 630 is an electronic wallet that stores a federation key 831. In other words, the user terminal 800 does not directly store one or more private keys and one or more certificates of the user, and stores only the federation ID 831 in the federation ID wallet 830, and transmits only the federation ID 831 to the service provider device 30 in order to request batch verification of one or more certificates.

FIG. 9 is a schematic view illustrating a participant for each chain in the system for a certificate based on a block chain according to the embodiments of the present disclosure.

Referring to FIG. 9, issuers 10-1, 10-2, 10-3, and 10-4 and service providers 30-1 and 30-2 participate in the on-chain 43, issuers, users, and trustee custodians who each belong to the same jurisdiction participate in respective open chains 41-1, 41-2, 41-3, and 41-4.

The system for a certificate based on a block chain according to the embodiments of the present disclosure may also be applied to various certificates within one country, but may also be applied to various certificates between multiple countries. For example, in FIG. 9, if A is Korea, B is the United States, C is Europe, and D is China, Korean issuer A (10-1), Korean user A (20-1), and Korean trustee custodian A (50-1) may participate in open chain A (41-1), US issuer B (10-2), US user B (20-2), and US trustee custodian B (50-2) may participate in open chain B (41-2), European issuer C (10-2), European user C (20-2), and European trustee custodian C (50-2) may participate in open chain C (41-2), and Chinese issuer D (10-2), Chinese user D (20-2), and Chinese trustee custodian D (50-2) may participate in open chain D (41-2).

Each operation of the system for a certificate based on a block chain according to the present disclosure may be implemented as the computer readable code in the computer readable recording medium. The computer readable recording medium includes all kinds of recording media storing data which may be deciphered by a computer system. For example, the recording media may include a read only memory (ROM), a random access memory (RAM), a magnetic tape, a magnetic disk, a flash memory, an optical data storage device, etc. Further, the computer readable recording media may be stored and executed as codes which may be distributed in the computer system connected through a computer communication network and read by a distribution method.

Hereinabove, the present disclosure has been described with reference to the drawings and embodiments, but it is not meant that the protection scope of the present disclosure is limited by the drawings or embodiments, but those skilled in the art will understand that the present disclosure can be variously modified and changed without departing from the spirit and the scope of the present disclosure which are defined in the appended claims.

STATEMENT REGARDING PRIOR DISCLOSURES BY THE INVENTOR OR A JOINT INVENTOR

The inventor of the present application has made related disclosure in PARK, Keundug, "Main Issue of Vaccination Certificate Based on Block Chain," "Digital economy innovating with blockchain" Policy Conference, Apr. 8, 2021. The related disclosure was made less than one year before the effective filing date (Aug. 18, 2021) of the present application and the inventors of the present application are the same as or include that of the related disclosure. Accordingly, the related disclosure is disqualified as prior art under 35 USC 102(a)(1) against the present application. See 35 USC 102(b)(1)(A).

The invention claimed is:

1. A system for a certificate based on a block chain, the system comprising:
   an issuer device issuing, in response to a certificate issuance request from a user terminal, a certificate including an electronic signature of an issuer to the user terminal, and storing information associated with the issuance of the certificate in an off-chain, wherein the certificate issuance request includes a first public key of a user and personal information of the user, and the information associated with the issuance of the certificate includes the first public key of the user, the personal information of the user, and a second public key of the issuer;
   a user terminal providing the certificate including the electronic signature of the user to a service provider terminal through wireless communication in order to verify the certificate; and
   a service provider terminal verifying the certificate through an on-chain, wherein the verifying of the certificate includes verifying the issuer, verifying the user, and verifying whether the certificate is forged or altered,
   wherein at least some of the information associated with the issuance of the certificate stored in the off-chain is synchronized and stored in the on-chain, wherein the personal information of the user among the information associated with the issuance of the certificate stored in the off-chain is not stored in the on-chain, and the on-chain stores, by synchronization with the off-chain, at least one of the first public key of the user, the second public key of the issuer, a first identifier of the user, and a second identifier of the issuer; and
   an electronic wallet storing a first private key of the user and the certificate.

2. The system of claim 1, wherein the wireless communication is Bluetooth or Wi-Fi Direct.

3. The system of claim 1, wherein the user terminal includes a wireless communication module for transmitting and receiving data to and from the service provider terminal through a wireless network.

4. A system for a certificate based on a block chain, the system comprising:
   an issuer device issuing, in response to a certificate issuance request from a user terminal, a certificate including an electronic signature of an issuer to the user terminal, and storing information associated with the issuance of the certificate in an off-chain, wherein the certificate issuance request includes a first public key of a user and personal information of the user, and the information associated with the issuance of the certificate includes the first public key of the user, the personal information of the user, and a second public key of the issuer; and
   a service provider terminal receiving the certificate including the electronic signature of the user from the user terminal through wireless communication, and verifying the certificate through an on-chain, wherein the verifying of the certificate includes verifying the issuer, verifying the user, and verifying whether the certificate is forged or altered,
      wherein at least some of the information associated with the issuance of the certificate stored in the off-chain is synchronized and stored in the on-chain, wherein the personal information of the user among the information associated with the issuance of the certificate stored in the off-chain is not stored in the on-chain, and the on-chain stores, by synchronization with the off-chain, at least one of the first public key of the user, the second public key of the issuer, a first identifier of the user, and a second identifier of the issuer; and
   an electronic wallet storing the first private key of the user and the certificate.

5. A system for a plurality of certificates based on a block chain, the system comprising:
   issuer devices each issuing, in response to respective certificate issuance requests, respective certificates including respective electronic signatures of issuers to a user terminal, and storing respective information associated with the issuance of the respective certificates in respective off-chains, wherein the respective certificate issuance requests include a first public key of a user, personal information of the user, and respective second public keys of the issuers;
   a user terminal providing at least some certificates among the plurality of certificates including respective electronic signatures of the user to a service provider terminal in batch through wireless communication in order to verify at least some certificates among the plurality of certificates; and
   a service provider terminal verifying at least some certificates among the plurality of certificates in batch through an on-chain, wherein the verifying of the certificate includes verifying the issuer, verifying the user, and verifying whether the certificate is forged or altered,
   wherein at least some of the respective information associated with the issuance of the respective certificates stored in the respective off-chains are synchronized and stored in the on-chain, wherein the personal information of the user among the respective information associated with the issuance of the respective certificates stored in the respective off-chains is not stored in the on-chain, and the on-chain stores, by synchronization with the respective off-chains, at least one of the first public key of the user, the respective second public keys of the issuers, a first identifier of the user, and respective second identifiers of the issuers; and
   an electronic wallet storing the first private key of the user and the certificate.

6. The system of claim 5, wherein the wireless communication is Bluetooth or Wi-Fi Direct.

7. The system of claim 5, wherein the user terminal includes a wireless communication module for transmitting and receiving data to and from the service provider terminal through a wireless network.

8. The system of claim 5, wherein the user terminal includes a wireless communication module for transmitting and receiving data to and from the service provider terminal through a wireless network, a plurality of electronic wallets storing the respective first private keys of the user and the respective certificates, respectively, wherein at least some of the respective first private keys of the user are different from the remaining first private keys other than at least some of the respective first private keys of the user, and an open application program interface (API) providing an interface for inter-compatibility between the plurality of electronic wallets.

9. A system for certificates based on a block chain, the system comprising:

issuer devices each issuing, in response to respective certificate issuance requests, respective certificates including respective electronic signatures of issuers to the user terminal, and storing respective information associated with the issuance of the respective certificates in respective off-chains, wherein the respective certificate issuance requests include a first public key of the user, personal information of the user, and respective second public keys of the issuers;

a user terminal transmitting, in order to entrust and store the respective first private keys of the user and the respective certificates in a trustee custodian, the respective first private keys of the user and the respective certificates to a trustee custodian device, and receiving a federation ID from the trustee custodian device in response to the transmission, and providing the federation ID to a service provider terminal through wireless communication in order to verify at least some of the certificates;

a service provider terminal transmitting the federation ID to the trustee custodian device, and transmitting a verification request for at least some of the certificates wherein the verifying of the certificate includes verifying the issuer, verifying the user, and verifying whether the certificate is forged or altered; and a trustee custodian device transmitting a verification approval request to the user terminal in response to the verification request from the service provider terminal, and when receiving verification approval from the user terminal, verifying at least some certificates among certificates in batch through an on-chain, and transmitting a result of the batch verification, wherein at least some of the respective information associated with the issuance of the respective certificates stored in the respective off-chains are synchronized and stored in the on-chain, wherein the personal information of the user among the respective information associated with the issuance of the respective certificates stored in the respective off-chains is not stored in the on-chain, and the on-chain stores, by synchronization with the respective off-chains, at least one of the first public key of the user, the respective second public keys of the issuers, a first identifier of the user, and respective second identifiers of the issuers; and an electronic wallet storing the first private key of the user and the certificate.

10. The system of claim 9, wherein at least some information of the respective information associated with the issuance of the respective certificates include at least one of the first public key of the user, respective second public keys of the at least one issuers, respective first identifiers of the user, and respective second identifiers of the at least one issuers.

11. The system of claim 9, wherein the wireless communication is Bluetooth or Wi-Fi Direct.

12. The system of claim 9, wherein the user terminal includes a wireless communication module for transmitting and receiving data to and from the service provider terminal through a wireless network, and an electronic wallet storing the federation ID.

* * * * *